United States Patent [19]
Musgrove et al.

[11] 3,902,457
[45] Sept. 2, 1975

[54] EGG SEPARATOR FOR FISH HATCHERY

[76] Inventors: Donald A. Musgrove, P.O. Box 117, Winlock, Wash. 98596; Laurence A. Buzzell, III, 3900 Kalama River Rd., Kalama, Wash. 98625

[22] Filed: May 21, 1974

[21] Appl. No.: 471,963

[52] U.S. Cl. .................................................. 119/3
[51] Int. Cl.² ............................................ A01K 61/00
[58] Field of Search ............... 119/2, 3, 4, 5; 43/55, 43/56; 209/119, 353, 273, 294

[56] References Cited
UNITED STATES PATENTS

| | | | |
|---|---|---|---|
| 600,784 | 3/1898 | Hammond | 209/119 |
| 1,718,442 | 6/1929 | Stanton | 209/353 |
| 3,680,694 | 8/1972 | Hamann | 209/119 |
| 3,683,854 | 8/1972 | Lewis | 119/3 |

Primary Examiner—G. E. McNeill
Assistant Examiner—Peter K. Skiff
Attorney, Agent, or Firm—Clarence A. O'Brien; Harvey B. Jacobson

[57] ABSTRACT

Incubating fish eggs are separated from non-fertilized eggs by dropping the eggs onto a downwardly inclined surface from which the incubating eggs bounce over a barrier into a receiver. The non-fertilized eggs are conveyed down the rebound surface into a separate receiver. The eggs are gravitationally conveyed to a drop-off edge closely spaced above the inclined surface after passing through screening.

12 Claims, 3 Drawing Figures

EGG SEPARATOR FOR FISH HATCHERY

This invention relates generally to the sorting of fish eggs at a fish hatchery and more particularly to the separation of living, incubating eggs from non-fertilized or dead eggs.

Separation of incubating eggs such as salmon eggs from dead eggs has been accomplished in the past in a tedious and time-consuming manner by use of tweezers. This method is, of course, expensive from the standpoint of man hours involved. Labor saving aids for this egg separating operation have heretofore been proposed, relying generally on a difference in buoyancy between living and dead eggs. A more recent example of such egg separating apparatus is disclosed in U.S. Pat. No. 3,683,854 to Lewis. Such prior egg separating apparatus have not, however, proved to be very practical.

A more practical and feasible method of separating fish eggs has been discovered which is based on the known characteristic of good incubating salmon eggs bouncing higher than bad eggs when dropped onto a rebound surface. Bad eggs are those that are infertile or fertilized but attacked by fungus or suffocated. The rebound elasticity property of living fish eggs deteriorates in non-fertilized or bag eggs as they become soft and mushy inside. The apparatus of the present invention utilizes the foregoing method of distinguishing between living and dead eggs with no damage to the eggs to rapidly and efficiently effect the desired separation.

In accordance with the present invention, fish eggs are deposited into a hopper mounting several vertically spaced screens through which the eggs are scattered and drop onto a slide surface for downward movement to a drop-off edge closely spaced above a downwardly inclined rebound surface. A barrier rising above a lower end portion of the rebound surface separates the good eggs, which bounce upwardly by a certain amount, from the bad eggs which return to the rebound surface and roll or slide into a receiving space below the barrier. A receptable for good eggs is positioned beyond the barrier. The good as well as the bad eggs may be flushed from their receivers by water supplied to both receivers from which separate outlet streams convey the eggs.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 3:
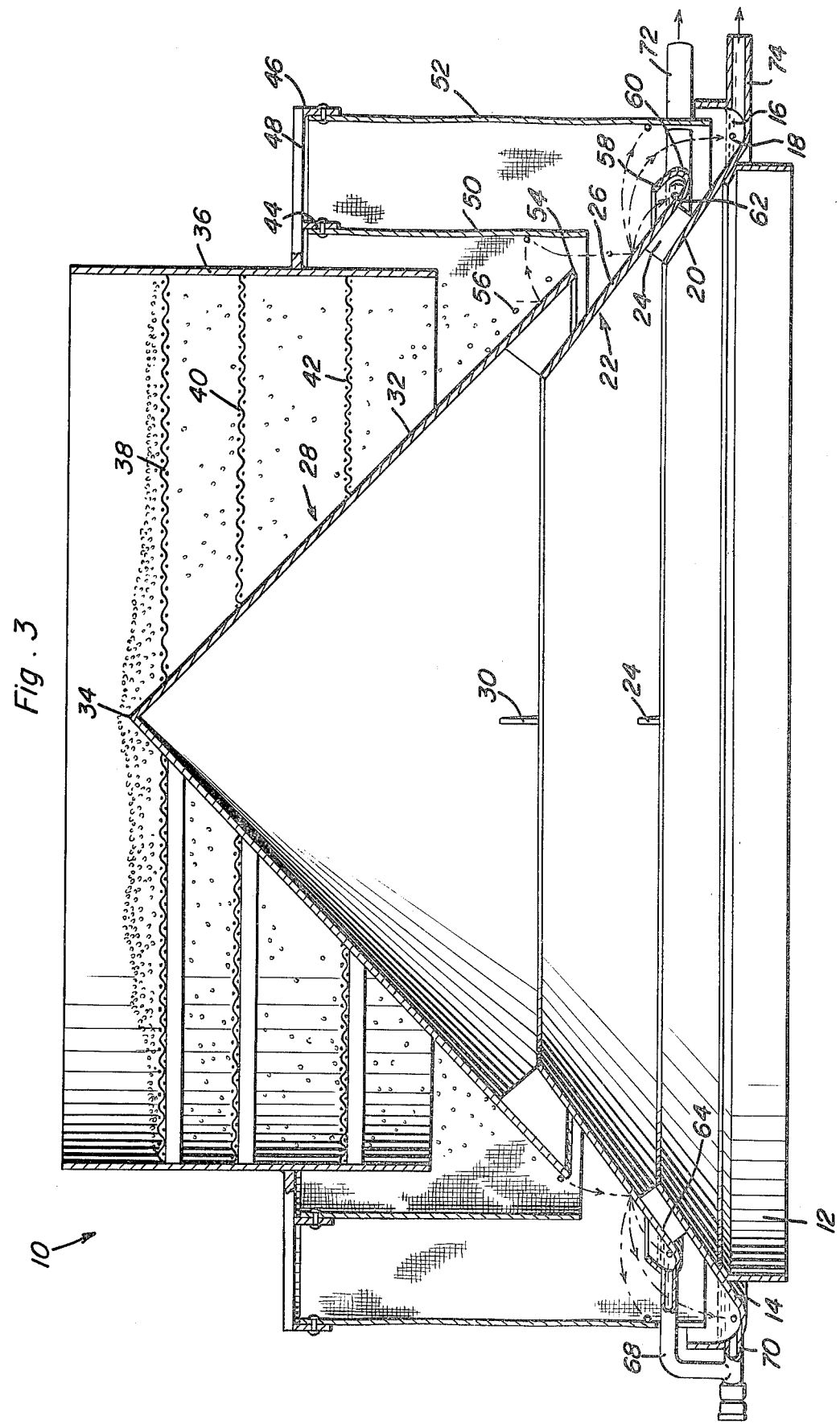
FIG. 3 is an enlarged side section view taken substantially through a plane indicated by section line 3—3 in FIG. 2.

Referring now to the drawings in detail, the apparatus generally referred to by reference numeral 10 is shown supported on a surface by an annular base 12 to which a lowermost annular trough 14 is connected. The trough 14 retains a body of water 16 into which good eggs 18 are deposited as shown in FIG. 3 and includes an upwardly inclined extension 20 to which an annular rebound member 22 is connected by spacers 24. The member 22 has an upper rebound surface 26 that is spaced above the trough 14 and inclined downwardly from an upper end spaced below and connected to an upper conical member 28. Suitable spacers 30 connect the conical member 28 to the rebound member 22 to form a rigid assembly with the base 12 and present a gravitational slide surface 32 extending at a downward incline from the apex 34.

The conical member projects upwardly into a cylindrical hopper 36 and is connected to vertically spaced, annular screens 38, 40 and 42 to which the internal surface of the hopper is secured in any suitable fashion as by welding. A pair of radially spaced rings 44 and 46 are concentrically secured to the hopper by radially extending rods 48 for suspending a pair of annular curtains 50 and 52. The radially inner curtain 50 extends below the lower drop-off edge 54 of the conical member 28 from which fish eggs 56 drop onto the rebound surface 26 and gently stops eggs to insure that all eggs drop from the same point with the same velocity. The other, radially outer curtain 52 extends below the lower end portion of the rebound member 22 to which an annular barrier 58 is connected by a channel forming extension 60 of the rebound member. The curtain 52 thus extends into the receiver trough 14 above the body of water 16 to stop any eggs with excess velocity and insure that they are all deposited into trough 14 with no damage. The curtains are made of a fabric material to gently limit movement of the eggs as described.

Figure 1:
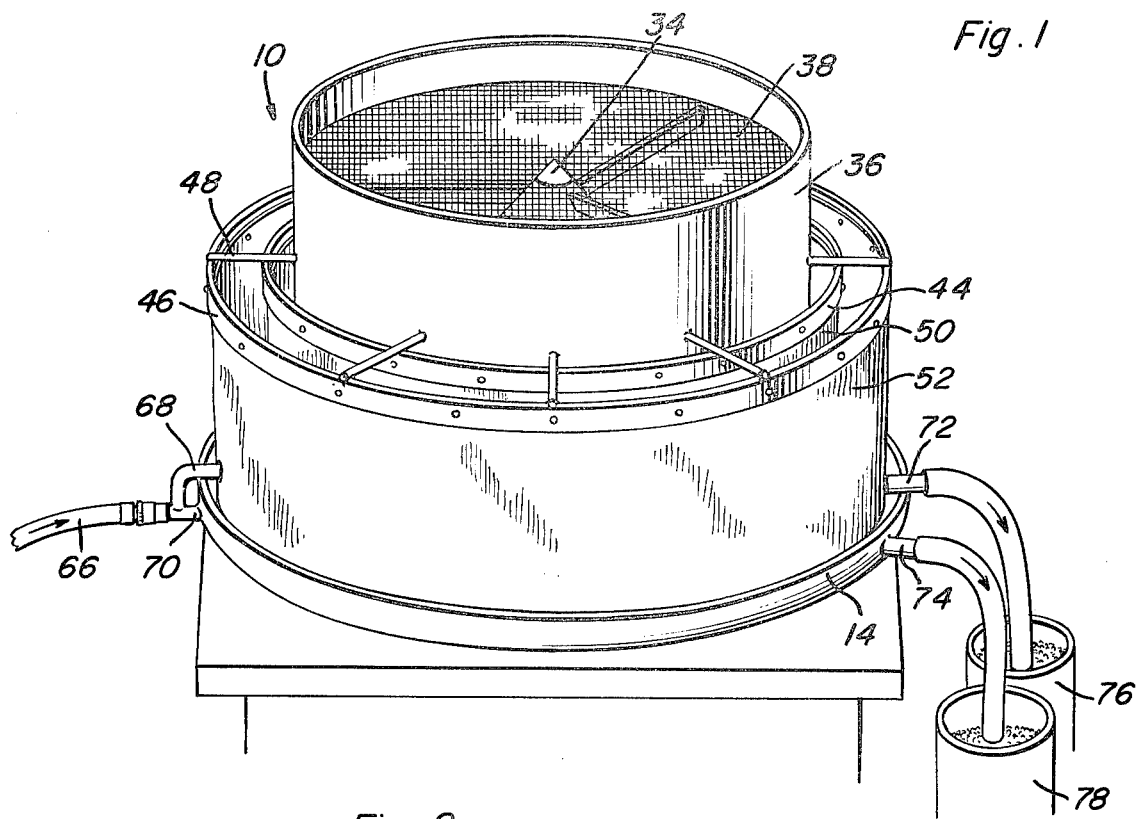
FIG. 1 is a perspective view of a fish egg separating apparatus constructed in accordance with the present invention.
Figure 2:
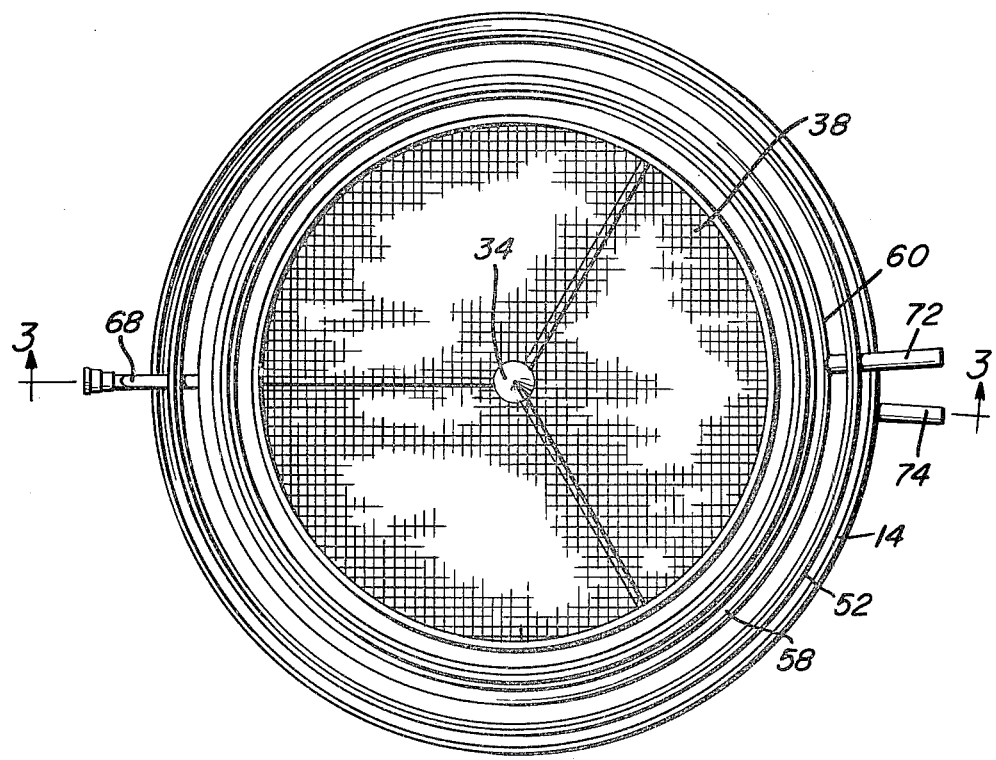
FIG. 2 is a top plan view of the apparatus shown in FIG. 1.

The annular channel extension 60 forms a receiver for bad eggs 62 that drop into a body of water 64 retained in the channel below the barrier 58 over which the good eggs bounce into the trough 14. The water or any other desired liquid is supplied to the channel 60 and trough 14 by a supply pipe 66 through a pair of parallel branch conduits 68 and 70. Outlet conduits 72 and 74 are respectively connected to the channel 60 and trough 14 in circumferentially spaced relation to the inlet conduits 68 and 70 and convey the bad and good eggs in separate liquid streams to receptacles 76 and 78 as shown in FIG. 1.

To use the apparatus for separation of good eggs from bad eggs, the eggs are sprinkled slowly into the top of hopper 36. The eggs begin to spread over the upper screen 38 as they drop onto the lower screens 40 and 42 before sliding downwardly along the slide surface 32. Any clumps of fungused eggs observed on the top screen 38, may be picked off by hand and discarded. The screens thus scatter or distribute the eggs over the conical slide surface 32 as well as to dimensionally limit the objects deposited onto the surface 32. A ¼ inch mesh screening material is utilized for salmon eggs. Other screen sizes may be used for handling other fish eggs susceptible to the separation process, such as steelhead or trout eggs.

The drop-off edge 54 of the conical member is spaced 1½ to 2 inches above the underlying rebound surface 26 to produce the requisite bounce of good eggs over the barrier 58 without damage to the eggs. This drop-off distance as well as the spacing of the barrier 58 from the drop-off edge 54 may be made adjustable. As shown by dotted lines in FIG. 3, the rebound trajectories of the incubating eggs 18 will carry them into the trough 14 whereas the bad eggs 62 are entrapped below the barrier 58 within the channel 60. The eggs are thereby tested for their rebound elasticity properties and if they exceed a certain bounce, indicative of viable eggs, they are separated from the others. The eggs respectively accumulated in the channel 60 and trough 14 may be continuously or intermittently flushed or conveyed in separate streams into the receptacles 76 and 78 by inflow of water from the supply pipe 66.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for separating viable fish eggs from non-viable eggs, including means for testing the rebound property of said eggs, means connected to said testing means for receiving eggs that rebound in excess of a predetermined amount, means for separating the less elastic objects returning to the testing means, and means for withdrawing the eggs collected in the receiving means and the separating means, said testing means including a downwardly inclined surface, means for dropping said eggs onto said surface and a barrier connected to said surface over which the viable eggs bounce into the receiving means, and the withdrawing means including a body of liquid maintained in the receiving means and the separating means, and conduit means connected to the receiving means and the separating means for conveying said objects therefrom in a stream of said liquid.

2. An apparatus for sorting objects that are physically distinguishable from each other by differences in rebound elasticity, comprising a hopper receiving said objects therein, gravitational slide means projecting into the hopper for downwardly conveying said objects from the hopper, rebound surface means mounted in spaced relation below said slide means for receiving said objects from the slide means, a barrier connected to the rebound surface means over which the more elastic objects bounce in response to impact with the surface means, collection means for receiving the more elastic objects from the rebound surface means, and means connected to the barrier for separating the less elastic objects returning to the rebound surface, a body of liquid being maintained in the collection means and the separating means, and conduit means connected to the collection means and the separating means for conveying said objects therefrom in a stream of said liquid.

3. The combination of claim 2 including screening means comprising at least one planar screen mounted in the hopper for dimensionally limiting downflow of said objects onto the slide means and spatially distributing the objects over the slide means.

4. The combination of claim 2 including curtain means engageable by the objects for limiting drop-off of the objects onto the rebound surface means and rebound therefrom.

5. An apparatus for sorting objects that are physically distinguishable from each other by differences in rebound elasticity, comprising a hopper receiving said objects therein, gravitational slide means projecting into the hopper for downwardly conveying said objects from the hopper, rebound surface means mounted in spaced relation below said slide means for receiving said objects from the slide means, a barrier connected to the rebound surface means over which the more elastic objects bounce in response to impact with the surface means, collection means for receiving the more elastic objects from the rebound surface means, means connected to the barrier for separating the less elastic objects returning to the rebound surface, screening means mounted in the hopper for dimensionally limiting downflow of said objects onto the slide means and spatially distributing the objects over the slide means, and a body of liquid maintained in the collection means and the separating means, and conduit means connected to the collection means and the separating means for conveying said objects therefrom in a stream of said liquid.

6. The combination of claim 5 wherein said slide means includes a conical member extending upwardly through the screening means within the hopper having a downwardly diverging surface terminating at a lower drop-off edge.

7. The combination of claim 6 wherein said impact surface means comprises an annular member underlying said lower drop-off edge, said barrier being closely spaced above a lower end portion of the annular member and connected thereto by the separating means which forms an annular channel.

8. The combination of claim 7 wherein said collection means comprises an annular trough underlying the lower end portion of the annular member.

9. The combination of claim 8 wherein said conduit means includes separate inlet and outlet tubes respectively connected to the annular channel and the annular trough and liquid supply means connected in parallel to the channel and trough for inducing flow of the liquid therethrough.

10. A method for separating viable fish eggs from non-viable fish eggs, comprising the steps of:
    a. dropping eggs onto a rebound surface;
    b. collecting eggs dropped in step (a) which rebound in excess of a predetermined amount;
    c. separating eggs dropped in step (b) which rebound less than the predetermined amount and return to the rebound surface; and
    d. subjecting the eggs collected in step (b) and separated in step (c) to separate liquid streams and conveying the eggs away from the rebound surface.

11. A method as set forth in claim 10, wherein the dropping step (a), includes the step of sliding the eggs down an inclined surface.

12. A method as set forth in claim 11, wherein the dropping step (a) further includes the step of dimensionally limiting downflow of the eggs and spatially distributing the eggs over the inclined surface.

* * * * *